United States Patent
Pi et al.

(10) Patent No.: US 8,543,149 B2
(45) Date of Patent: Sep. 24, 2013

(54) MESSAGE-BASED APPROACH FOR IMPROVED INTERFERENCE POWER ESTIMATION

(75) Inventors: Zhouyue Pi, Richardson, TX (US); Farooq Khan, Allen, TX (US)

(73) Assignee: Samsung Electronics Co., Ltd, Suwon-si (KR)

( * ) Notice: Subject to any disclaimer, the term of this patent is extended or adjusted under 35 U.S.C. 154(b) by 949 days.

(21) Appl. No.: 12/286,223

(22) Filed: Sep. 29, 2008

(65) Prior Publication Data

US 2009/0253447 A1 Oct. 8, 2009

Related U.S. Application Data

(60) Provisional application No. 61/064,968, filed on Apr. 4, 2008.

(51) Int. Cl.
*H04Q 7/20* (2006.01)

(52) U.S. Cl.
USPC .......... 455/501; 455/522; 455/69; 455/67.11; 455/517; 455/500; 370/328; 370/329; 370/330; 370/310; 370/343

(58) Field of Classification Search
USPC ............ 455/501, 522, 69, 445, 500, 517, 455/67.11, 63.1, 127.1, 550.1, 403, 422.1, 455/426.1, 426.2, 450, 509, 561; 370/328, 370/329, 330, 310, 333, 337, 341, 343, 345, 370/338
See application file for complete search history.

(56) References Cited

U.S. PATENT DOCUMENTS

| | | | |
|---|---|---|---|
| 6,201,795 B1* | 3/2001 | Baum et al. | 370/252 |
| 6,667,965 B1* | 12/2003 | Yamaura et al. | 370/347 |
| 6,690,665 B1 | 2/2004 | Choi et al. | |
| 2005/0276361 A1 | 12/2005 | Kim et al. | |
| 2007/0173261 A1* | 7/2007 | Priotti et al. | 455/450 |
| 2007/0183522 A1 | 8/2007 | Garrett et al. | |
| 2007/0291702 A1* | 12/2007 | Nanba et al. | 370/336 |

FOREIGN PATENT DOCUMENTS

| | | |
|---|---|---|
| KR | 2003/0088607 A | 11/2003 |
| WO | WO 2004/104530 A2 | 12/2004 |
| WO | WO 2007/078099 A1 | 7/2007 |
| WO | WO 2007/108769 A1 | 9/2007 |
| WO | WO 2009/052754 A1 | 4/2009 |

OTHER PUBLICATIONS

European Search Report dated Jul. 31, 2009 in connection with European Patent Application No. EP 09 15 5748.
Notification of Transmittal of the International Search Report and the Written Opinion of the International Searching Authority, or the Declaration dated Jul. 27, 2009 in connection with PCT Application No. PCT/KR2009/000404.
European Examination Report dated Oct. 11, 2012 in connection with European Patent Application No. EP 09155748.8, 4 pages.

\* cited by examiner

*Primary Examiner* — Keith Ferguson (57) ABSTRACT

A method of operating a base station comprising determining one or more time-frequency resources to be used for interference power estimation, generating a message indicating the one or more time-frequency resources to be used for interference power estimation, and transmitting the message to a subscriber station.

30 Claims, 9 Drawing Sheets

MESSAGE-BASED APPROACH FOR IMPROVED INTERFERENCE POWER ESTIMATION

CROSS-REFERENCE TO RELATED APPLICATION(S) AND CLAIM OF PRIORITY

The present application is related to U.S. Provisional Patent No. 61/064,968, filed Apr. 4, 2008, entitled "METHODS AND APPARATUS TO IMPROVE INTERFERENCE ESTIMATION IN OFDMA SYSTEM". Provisional Patent No. 61/064,968 is assigned to the assignee of the present application and is hereby incorporated by reference into the present application as if fully set forth herein. The present application hereby claims priority under 35 U.S.C. §119(e) to U.S. Provisional Patent No. 61/064,968.

TECHNICAL FIELD OF THE INVENTION

The present application relates generally to wireless communications and, more specifically, to a technique for improved interference power estimation.

BACKGROUND OF THE INVENTION

In an Orthogonal Frequency-Division Multiple Access (OFDMA) system, interference power often varies in frequency and time due to frequency and time selective fading. Interference power also varies due to frequency and time domain power adaptation. It is important for an OFDMA system design to utilize variations in the interference power to maximize system performance. Accordingly, an efficient mechanism to facilitate interference power estimation is necessary.

Normally, interference power is estimated based on the measured channel characteristics of either the pilot channels or the data channels. This estimation is often coupled with channel estimation or data channel detection, which requires a complicated receiver design, and often leads to unsatisfactory results. In an OFDMA system such as a 3GPP LTE system, this problem is exacerbated because the reference signals are only located in a few OFDMA symbols. Therefore, if all base stations are synchronized, the reference signals can collide with one another in some OFMDA symbols while there are no reference signals in other OFMDA symbols. Accordingly, the interference power estimation based on reference signals can be much higher than the actual interference power experienced by the data channel in a lightly loaded system, which may result in pessimistic channel quality indicator (CQI) reporting and poor system performance.

Therefore, there is a need in the art for an improved system and method for estimating interference power. In particular, there is a need for an interference power estimation technique that takes advantage of the dynamic nature of an OFDMA system.

SUMMARY OF THE INVENTION

A method of operating a base station comprising determining one or more time-frequency resources to be used for interference power estimation, generating a message indicating the one or more time-frequency resources to be used for interference power estimation, and transmitting the message to a subscriber station.

A wireless communication network comprising a plurality of base stations, capable of wireless communication with a plurality of subscriber stations within a coverage area of said network, wherein at least one of said plurality of base stations is capable of determining one or more time-frequency resources to be used for interference power estimation, generating a message indicating the one or more time-frequency resources to be used for interference power estimation, and transmitting the message to a subscriber station.

A base station capable of wireless communication with a plurality of subscriber stations within a coverage area of a network, said base station capable of determining one or more time-frequency resources to be used for interference power estimation, generating a message indicating the one or more time-frequency resources to be used for interference power estimation, and transmitting the message to a subscriber station.

A subscriber station capable of wireless communication with a base station within a coverage area of a network, said subscriber station capable of receiving a message indicating one or more time-frequency resources to be used for interference power estimation; decoding the message; and estimating an interference power using the one or more time-frequency resources indicated in the message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
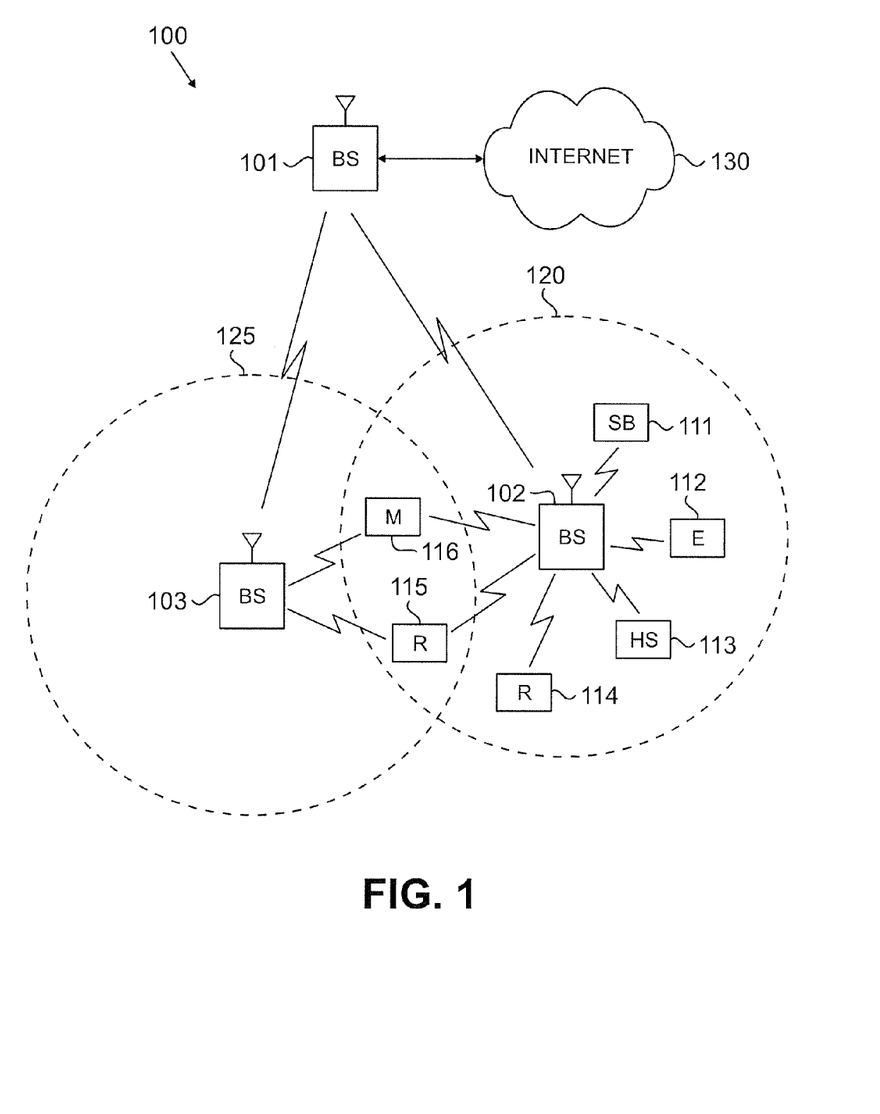
FIG. 1 illustrates an exemplary wireless network that transmits data to and receives data from subscriber stations according to the principles of the present disclosure.

FIG. 1 illustrates exemplary wireless network 100, which transmits data to and receives data from subscriber stations according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
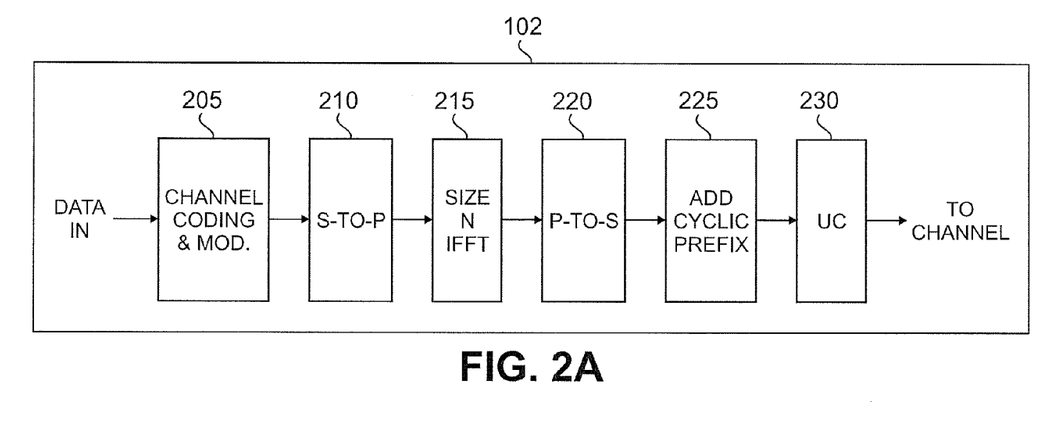
FIG. 2A is a high-level diagram of an OFDMA transmitter according to one embodiment of the present disclosure.
Figure 2B:
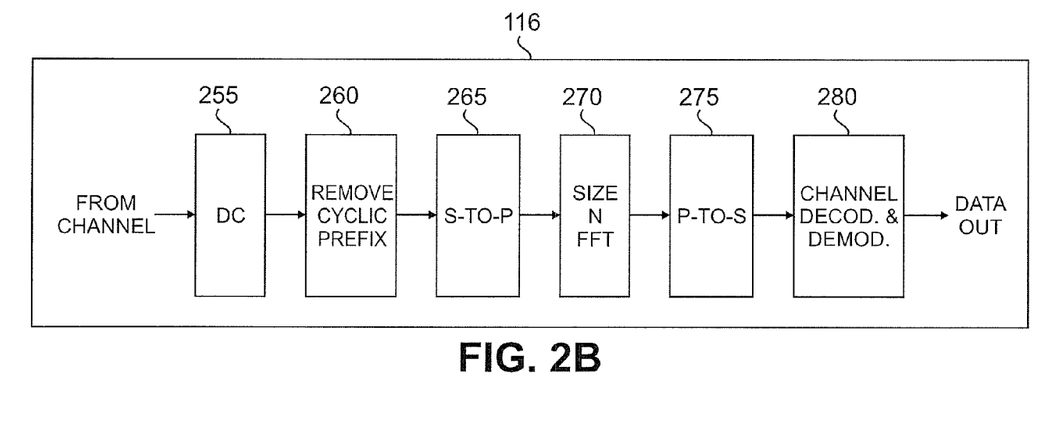
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated-symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system that takes advantage of the dynamic nature of an OFDMA system by utilizing one or more messages to indicate the time-frequency resources that a subscriber station or subscriber stations can use to improve interference power estimation. The time-frequency resources indicated in the one or more messages may be a resource element or a sub-carrier and may be either used, unused, or a mixture of both.

In one embodiment of the invention, for example, a base station decides which set of time-frequency resources that a subscriber station can use to estimate interference power based on system deployment information, such as frequency reuse factor, inter-cell interference management schemes, or fractional frequency reuse patterns. The base station then transmits at least one message indicating these resources to a subscriber station. At the receiver side, provided that the message is correctly received, the subscriber station uses the resources indicated in the message to improve interference power estimation.

Unused time-frequency resources are often available due to hybrid automatic repeat request (HARQ) early termination, flexible frequency reuse, scheduling and so forth. The term "unused" refers to time-frequency resources that do not have any signal waveforms transmitted on them, and no transmission power is allocated to these time-frequency resources. The subscriber station can utilize these unused time-frequency resources for interference power estimation. Because of the dynamic nature in which time-frequency resources may become unused, the base station may use, for example, signaling messages and/or control channel messages to indicate the positions of these time-frequency resources to the subscriber station. Because unused time-frequency resources can be highly fragmented, the base station may indicate only a subset of the unused time-frequency resources to the subscriber station for interference power estimation purposes in order to reduce the signaling or control overhead.

In one such embodiment, the base station transmits to one or more subscriber stations at least one message indicating all or a subset of the time-frequency resources that are not being used for the transmission of any signals. Since these time-frequency resources are not used for data or control channel transmission, the subscriber stations can measure the interference power on these resources directly, provided the message is correctly received. This greatly simplifies the interference power estimation algorithm and improves the interference power estimation accuracy as there is no signal power in the unused time-frequency resources that must be taken into account.

In IEEE 802.16m or 3GPP LTE systems, for example, the message indicating the unused resources may be transmitted in every subframe, which is the typical time interval for scheduling and transmission in such systems. In such an embodiment, the base station can dynamically adjust the indication depending on what resources are scheduled or left unused, minimizing the impact to scheduling flexibility or system capacity. Of course, one of ordinary skill in the art would recognize that it is certainly possible to transmit the message indicating the unused time-frequency resources more or less frequently. Also, the transmission of the message indicating the unused time-frequency resources can be either periodic or aperiodic on predetermined or dynamically scheduled time and time-frequency resources.

Although the smallest unit of time-frequency resource is typically a sub-carrier within an OFDM symbol (or a resource element in 3GPP LTE terminology), in one embodiment, the resource indication in the message is based on one of the typical resource allocation units (for example, a resource block (RB) in 3GPP LTE terminology).

In another embodiment of the invention, the base station may intentionally reserve some time-frequency resources for interference power estimation for a certain period of time. During this time, the base station does not transmit any signal waveform on the reserved time-frequency resources.

In one such embodiment, a number of time-frequency resource units are reserved to facilitate interference power estimation, for example, a set of sub-carriers. These sub-carriers may be scattered across time and frequency. At the receiver side, the received signal on these sub-carriers is simply interference power. The receiver can then use these sub-carriers to estimate interference power. The interference power estimation can then be used to perform channel estimation and data channel detection. The reserved time-frequency resource units can change on an OFDM symbol level, or subframe level, or other time scale.

In another embodiment, the base station transmits a message indicating that an entire OFDM symbol is reserved. The receiver can then estimate interference power from the reserved OFDM symbol. This embodiment may be implemented, for example, by using one state of the physical control format indication channel (PCFICH). PCFICH contains two bits indicating the number of OFDM symbols used for control in a subframe. Since at most three OFDM symbols can be used for control, the fourth state is left unused. Accordingly, the fourth state can be used to indicate that an OFDM symbol is reserved for interference power estimation in this subframe. One example is shown in Table 1 below.

TABLE 1

| PCFICH value | Interpretation |
|---|---|
| '00' | Control channels occupy the 1$^{st}$ OFDM symbol, and the X-th OFDM symbol is reserved for interference power estimation. |

TABLE 1-continued

| PCFICH value | Interpretation |
| --- | --- |
| '01' | Control channels occupy the $1^{st}$ OFDM symbol. |
| '10' | Control channels occupy the $1^{st}$ and $2^{nd}$ OFDM symbols. |
| '11' | Control channels occupy the $1^{st}$, $2^{nd}$, and $3^{rd}$ OFDM symbols. |

In this example, the state '00' is used to indicate that the $1^{st}$ OFDM symbol is used for control, and the X-th OFDM symbol is reserved for interference power estimation. Of course, one of ordinary skill in the art would recognize that any OFDM symbol may be reserved for interference power estimation without departing from the spirit of the invention.

In a further embodiment, a set of time-frequency resources are reserved for interference power estimation, but the reservation is controlled by a control channel message. For example, the system can configure a set of subcarriers, or at least one OFDM symbol, to be reserved for interference power estimation. In addition, the reservation remains effective only when a certain message is present, or when a message or a certain field of a message equals a particular value. One example is shown in Table 2 below.

TABLE 2

| PCFICH value | Interpretation |
| --- | --- |
| '00' | Control channels occupy the $1^{st}$ and $2^{nd}$, and the reservation for interference power estimation is effective. |
| '01' | Control channels occupy the $1^{st}$ OFDM symbol. |
| '10' | Control channels occupy the $1^{st}$ and $2^{nd}$ OFDM symbols. |
| '11' | Control channels occupy the $1^{st}$, $2^{nd}$, and $3^{rd}$ OFDM symbols. |

In this example, the state '00' is used to indicate that the $1^{st}$ and the $2^{nd}$ OFDM symbols are used for control, and the reservation for interference power estimation is effective in this subframe. Of course, one of ordinary skill in the art would recognize that the reservation can be defined as a set of sub-carriers, or one or more OFDM symbols.

In yet another embodiment of the invention, the base station transmits a message with an identifier and an indication of resources that are not used for transmission or that may be used for interference power estimation. For example, a special media access control (MAC) ID (or a user equipment (UE) ID) can be used for this purpose. In such an embodiment, when the base station wants to indicate the resources that are not used for transmission or that may be used by subscriber stations for interference power estimation, the base station transmits the message with the resource indication using that special MAC ID (or UE ID). The subscriber stations can monitor for messages with this special MAC ID. If a message is detected, correctly decoded, and MAC ID in the message matches with the special MAC ID, the subscriber station can use the resources indicated in the message to improve interference power estimation.

The determination of the unused resources or reserved resources can be either static, semi-static, or dynamic. Also, the determination of these resources may be coordinated with the other radio resource management functions such as scheduling, resource allocation, and so forth. The transmission of the message also may be coordinated with the transmission of other control channels or data channels in terms of time-frequency resources and power allocation.

Figure 3A:
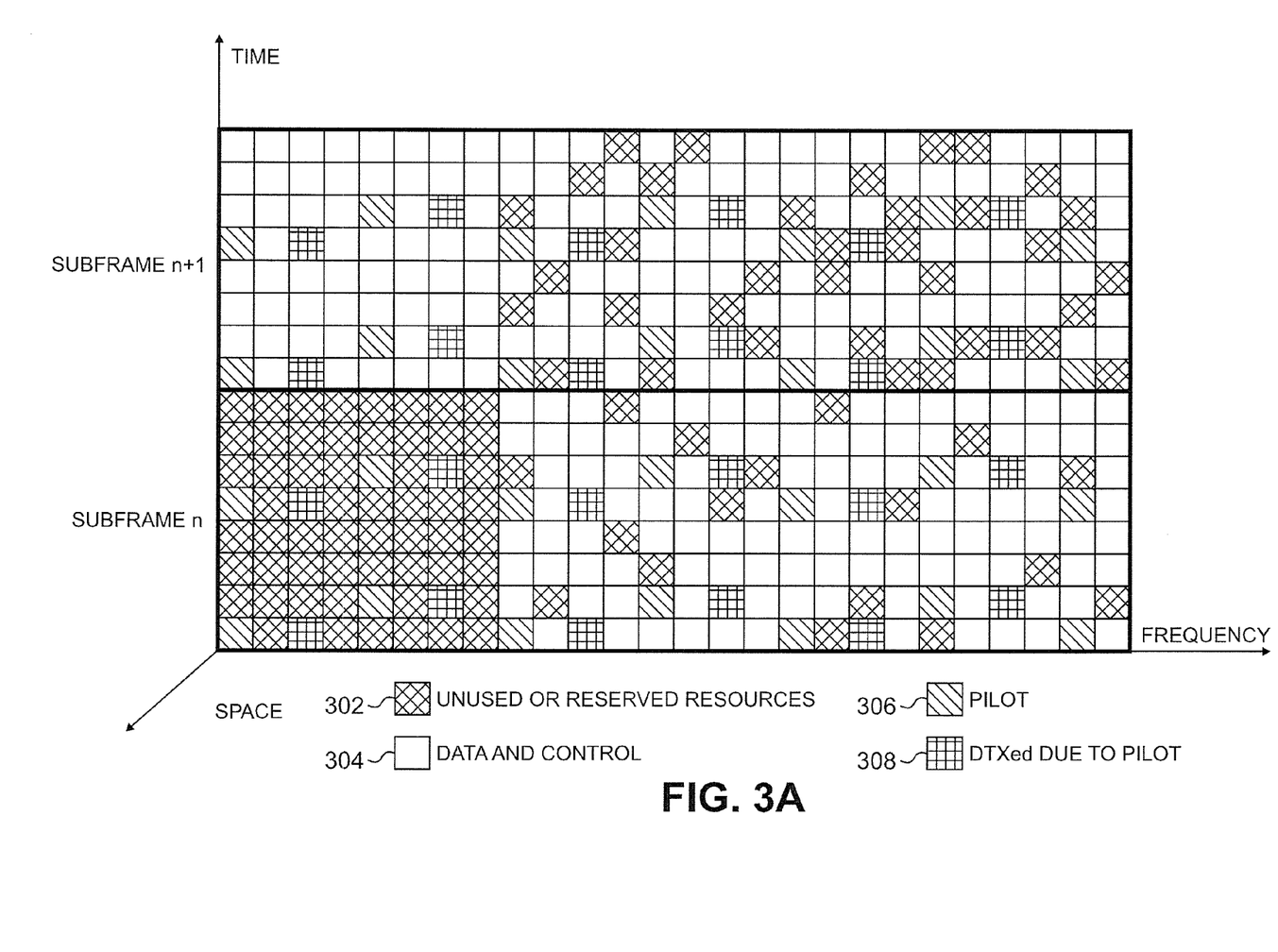
FIG. 3A illustrates the status of time-frequency resources at a first antenna in a transmitting or base station according to one embodiment of the present disclosure.
Figure 3B:
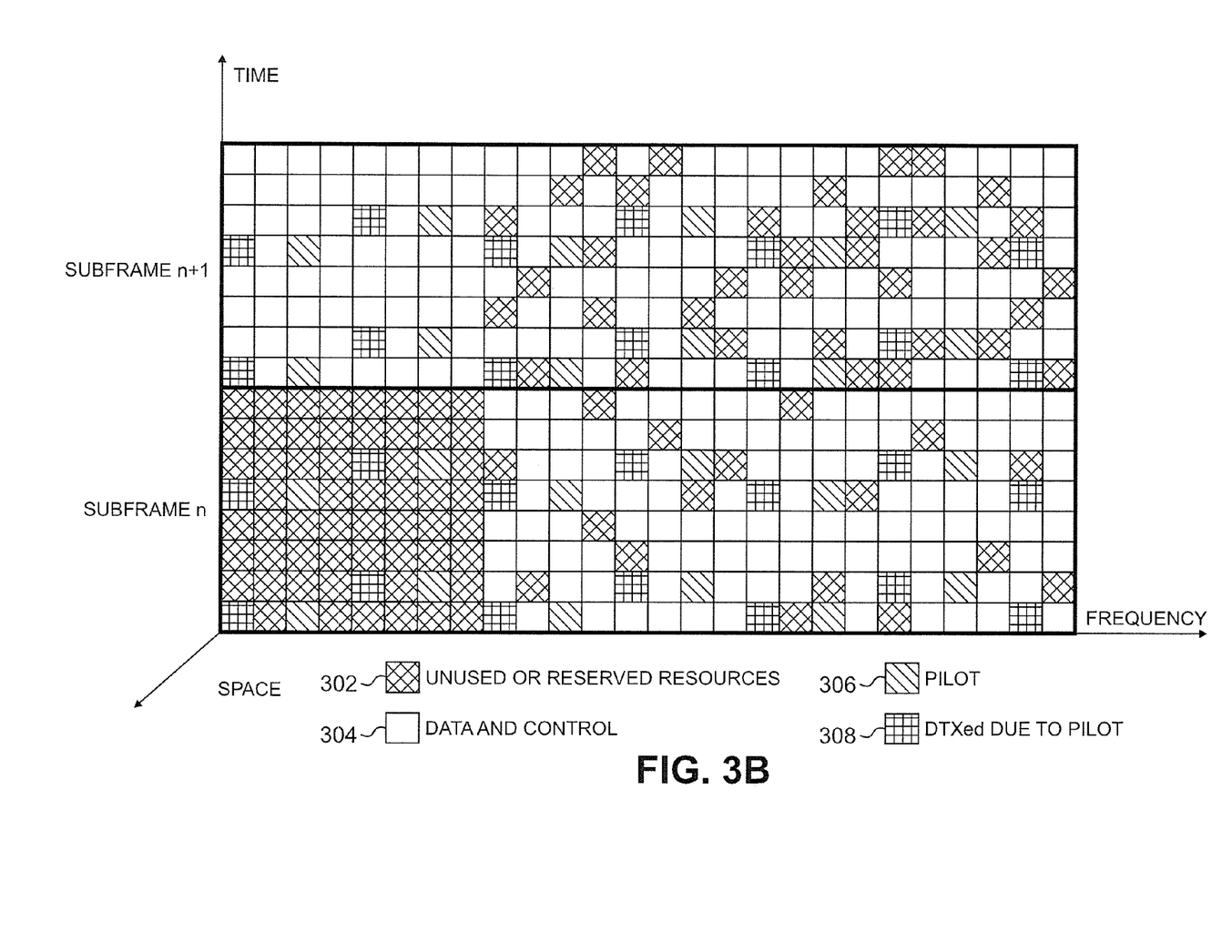
FIG. 3B illustrates the status of time-frequency resources at a second antenna in a transmitting or base station according to one embodiment of the present disclosure.

As shown in FIGS. 3A and 3B, the unused or reserved resources may be either contiguous in frequency and time, or spread in the time and frequency domain. FIG. 3A illustrates the status of the time-frequency resources at a first antenna at the transmitting or base station. In this figure, the resources 302 represent the unused or reserved time-frequency resources. The resources 304 are used for data and control. The resources 306 are pilot symbols, and the resources 308 represent resources that are operating in a discontinuous transmission mode due to the corresponding pilot symbols at the receiving or subscriber station end. FIG. 3B illustrates the status of the time-frequency resources at a second antenna at the transmitting or base station.

Figure 4A:
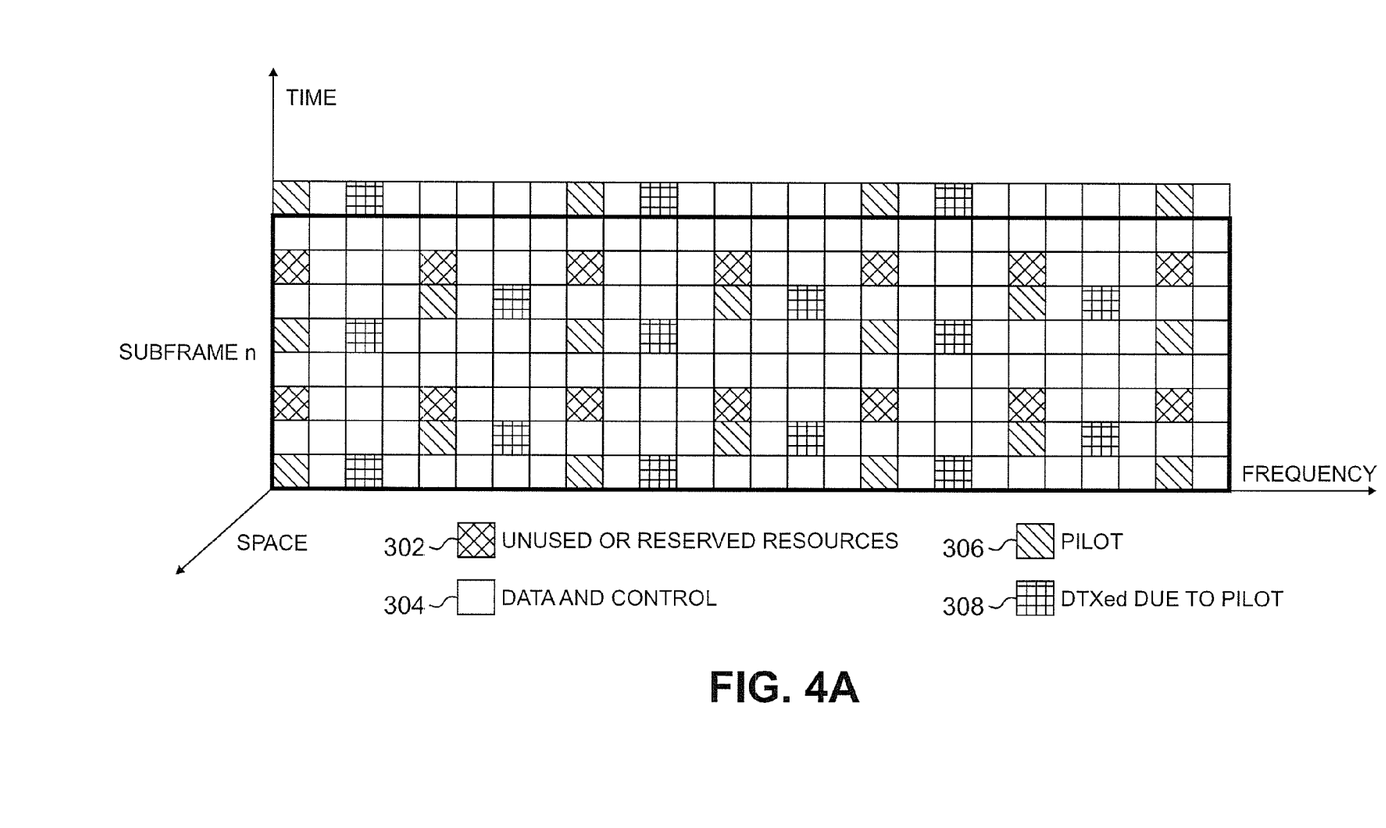
FIG. 4A illustrates the status of time-frequency resources at a first antenna in a transmitting or base station according to another embodiment of the present disclosure.
Figure 4B:
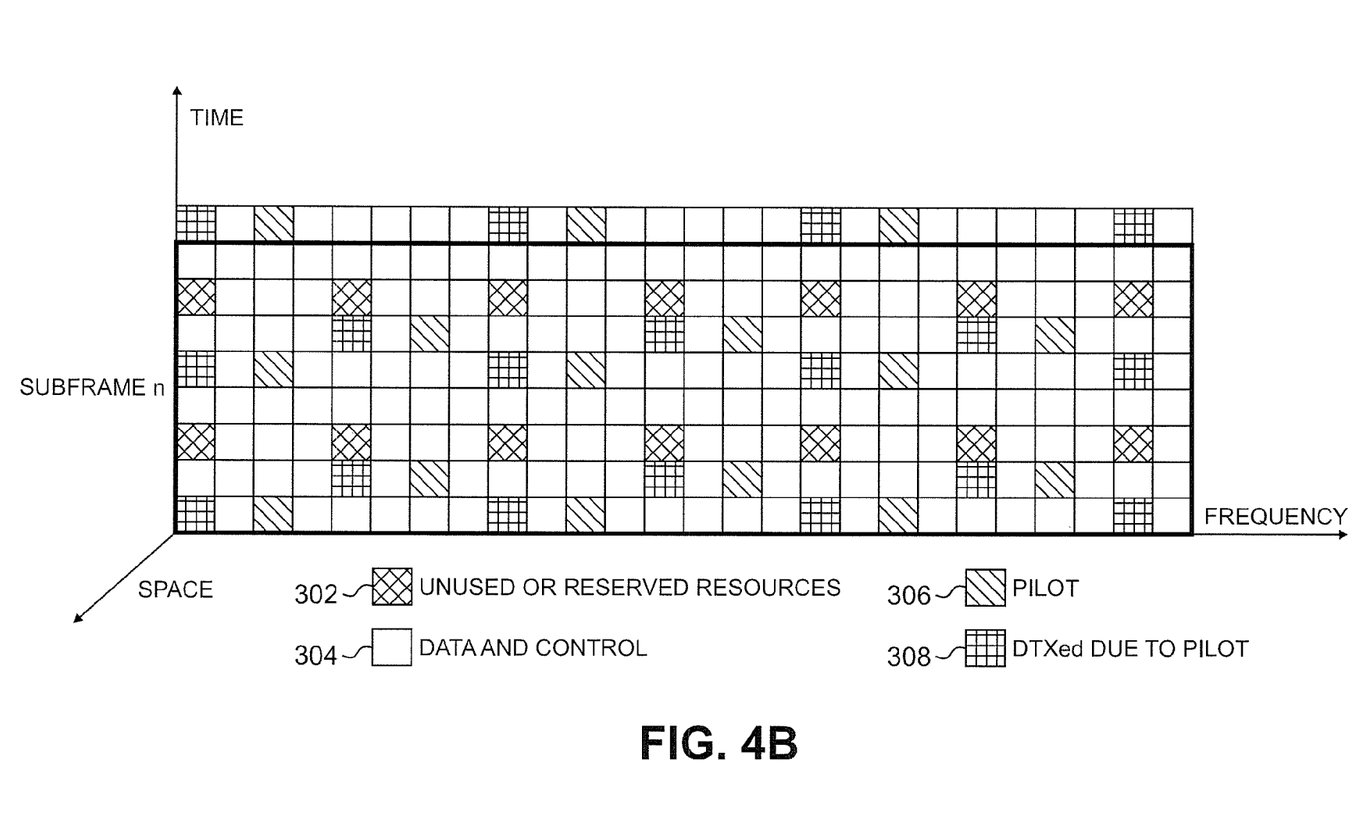
FIG. 4B illustrates the status of time-frequency resources at a second antenna in a transmitting or base station according to another embodiment of the present disclosure.

FIGS. 4A and 4B illustrate an embodiment of a multiple-input multiple-output (MIMO) system in which the unused or reserved time-frequency resources of different antennas are placed on the same positions in the time and frequency grid. FIG. 4A illustrates the status of the time-frequency resources at a first antenna at the transmitting or base station, and FIG. 4B illustrates the status of the time-frequency resources at a second antenna at the transmitting or base station. In a MIMO system, the pilot channels from different antennas are normally put on orthogonal positions in certain dimensions. However, by placing the unused or reserved time-frequency resources of different antennas on the same positions in the time and frequency grid, the receiver or subscriber station will be able to measure the true interference power from other sectors easily. This embodiment does not require more frequency bandwidth as the number of antennas increases. A single set of reserved or unused time-frequency resources can be used for interference power estimation at multiple antennas.

In still yet another embodiment of the invention, the aforementioned two approaches can be combined. For example, a small fraction of the bandwidth can be dedicated to facilitate interference power estimation. While at the same time, when certain resource channels become unused, a signaling message or a control channel message can be used to indicate the positions of the whole set or a subset of the unused time-frequency resources to the subscriber stations to facilitate interference power estimation.

The base station may use a combination of signaling messages and control channel messages to indicate the unused or reserved time-frequency resources. For example, when the time-frequency resources become unused or can be reserved for more than hundreds of milliseconds, a signaling message could be used to indicate the position of the unused or reserved time-frequency resources. However, there are times when the time-frequency resources are unused or reserved during a much shorter time period (for example, the time-frequency resources may become unused during HARQ early termination). In such cases, a control channel message is more efficient for indicating which time-frequency resources are unused or reserved for interference power estimation during a short period of time, such as one or multiple subframes.

Figure 5A:
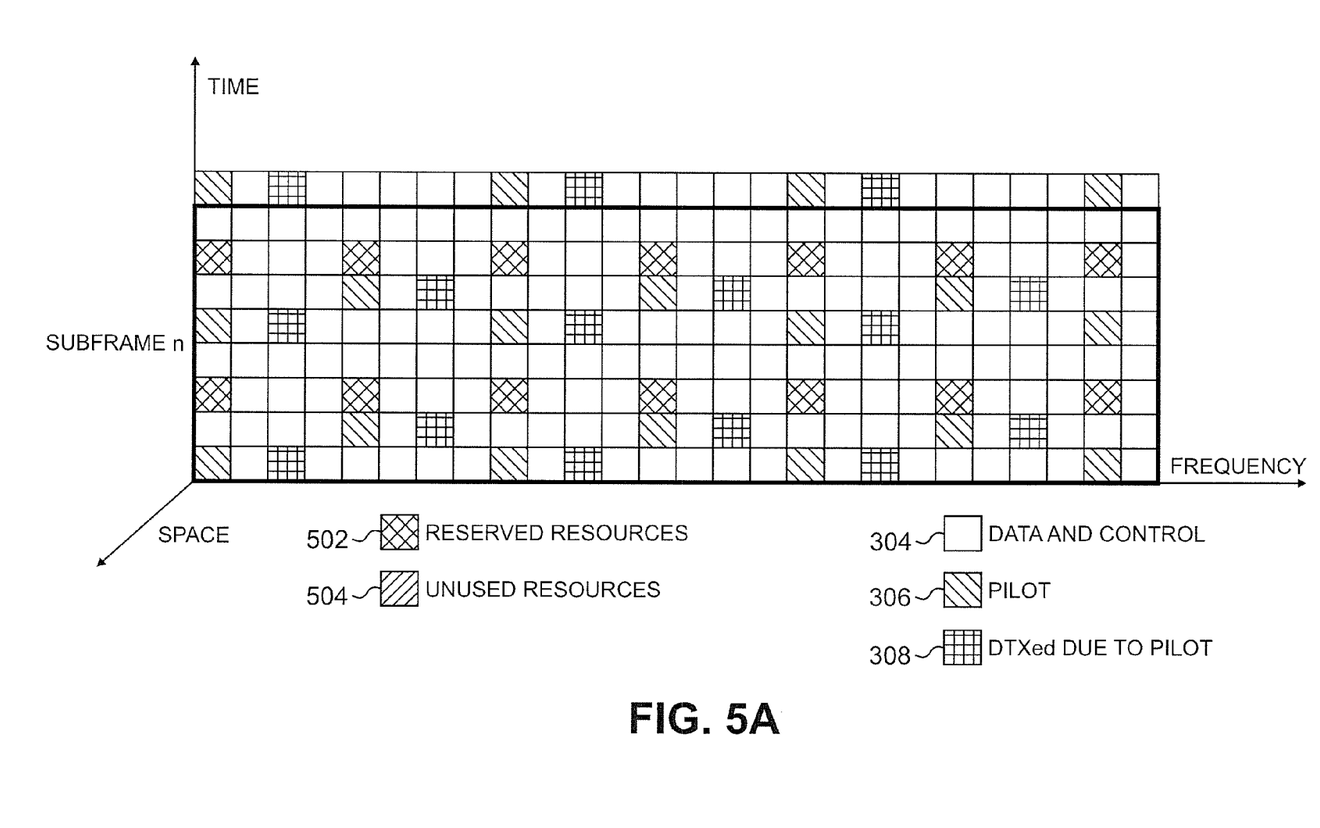
FIG. 5A illustrates the status of time-frequency resources at a first antenna in a transmitting or base station according to a further embodiment of the present disclosure.
Figure 5B:
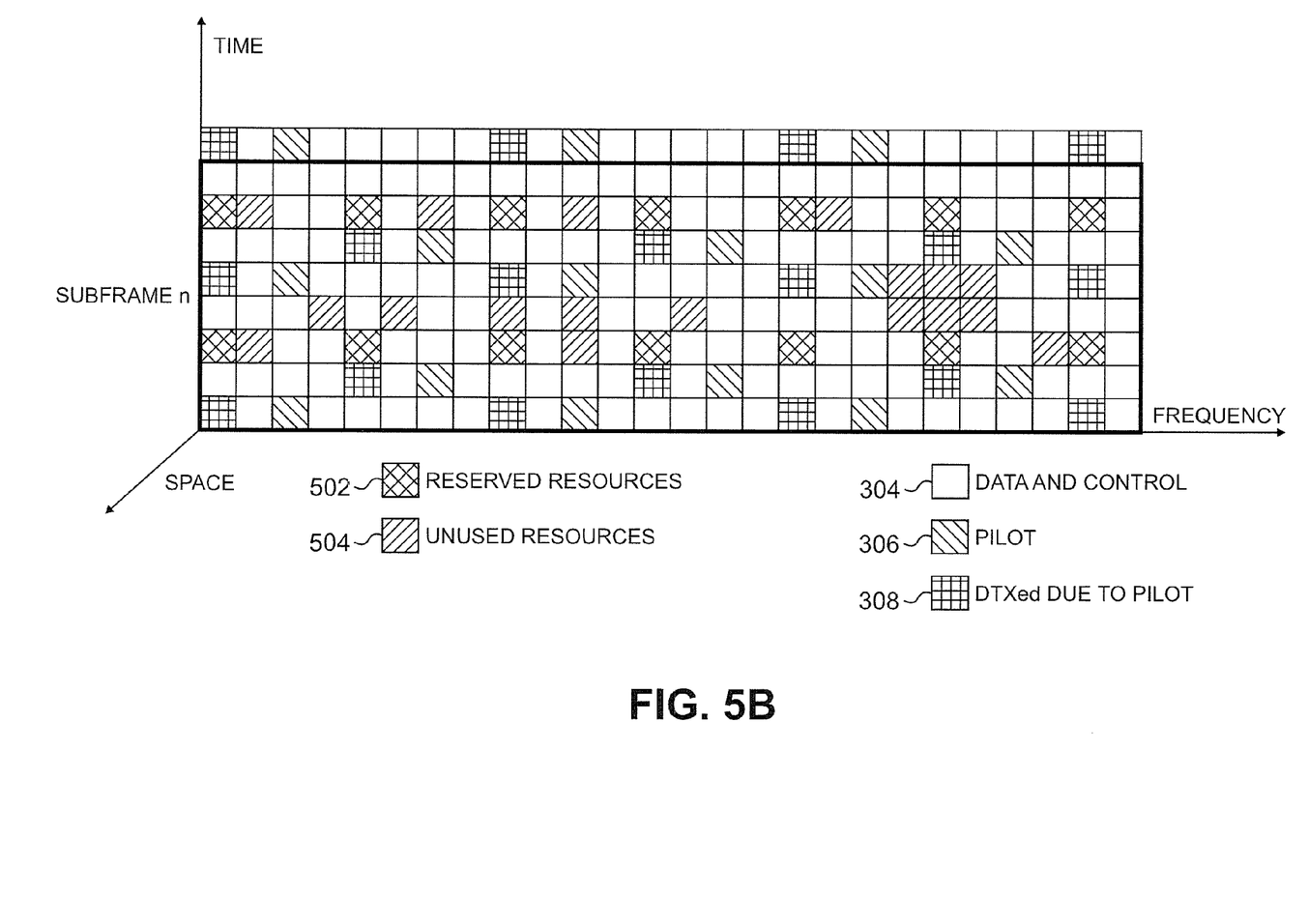
FIG. 5B illustrates the status of time-frequency resources at a second antenna in a transmitting or base station according to a further embodiment of the present disclosure.

FIGS. 5A and 5B illustrate an embodiment in which both unused and reserved time-frequency resources are depicted. FIG. 5A illustrates the status of the time-frequency resources at a first antenna at the transmitting or base station. As in the previous figures, the resources 304 are used for data and control. The resources 306 are pilot symbols, and the resources 308 represent resources that are operating in a discontinuous transmission mode due to the corresponding pilot symbols at the receiving or subscriber station end. In this figure, the resources 502 represent the reserved time-frequency resources, and the resources 502 represent the unused time-frequency resources. FIG. 5B illustrates the status of the time-frequency resources at a second antenna at the transmitting or base station.

Figure 6:
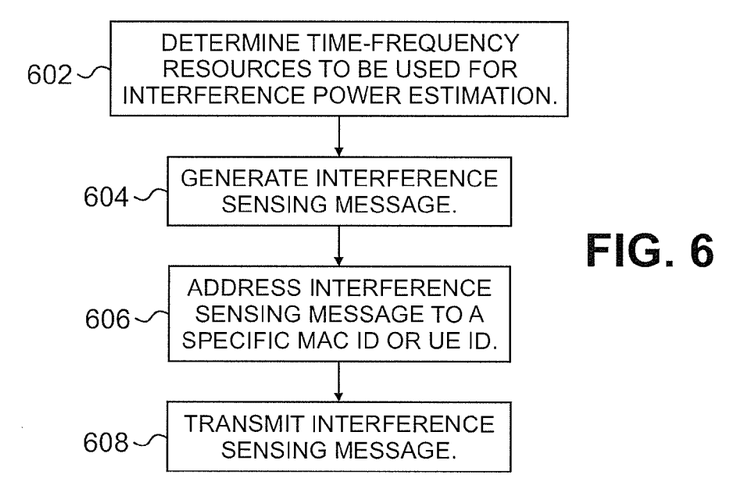
FIG. 6 illustrates a method of operating a base station (or a transmitter) according to an embodiment of the disclosure.

FIG. 6 illustrates a method of operating a base station (or a transmitter) according to an embodiment of the disclosure. In step 602, the base station determines the time-frequency resources to be used for interference power estimation. The time-frequency resources used for interference power estimation may be used time-frequency resources, unused time-frequency resources, reserved time-frequency resources, or any combination of thereof. In some embodiments, the determination of these resources is coordinated with the other radio resource management function such as scheduling, resource allocation, and so forth. In step 604, an interference sensing message is generated by the base station. The interference sensing message indicates the time-frequency resources to be used for interference power estimation.

A subscriber station typically needs to monitor multiple types of control messages and sometimes multiple MAC IDs or UE IDs. In step 606, the base station addresses the interference sensing message to a specific MAC ID or UE ID. In step 608, the base station transmits the interference sensing message. In some embodiments, the transmission of the interference sensing message is coordinated with the transmission of other control channels or data channels in terms of time-frequency resources and power allocation. A subscriber station that is configured to monitor and receive the interference sensing message addressed to this MAC or UE ID will attempt to decode the message, among the other messages that subscriber station needs to monitor.

Figure 7:
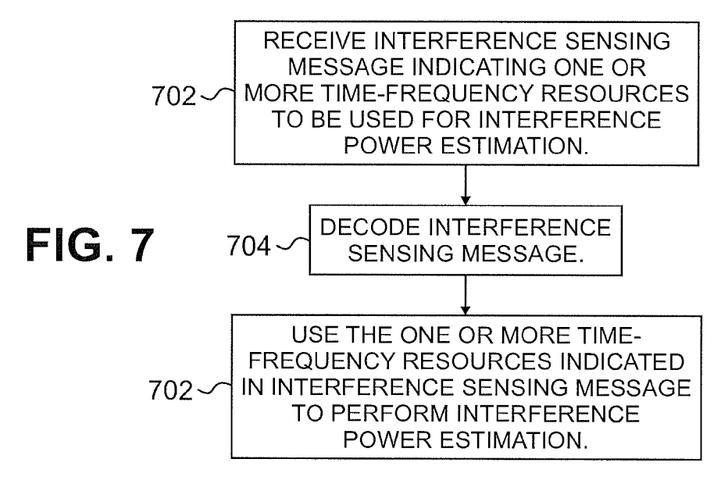
FIG. 7 illustrates a method of operating a subscriber station (or a receiver) according to an embodiment of the disclosure.

FIG. 7 illustrates a method of operating a subscriber station (or a receiver) according to an embodiment of the disclosure. The subscriber station receives an interference sensing message indicating one or more time-frequency resources to be used for interference power estimation in step 702 and decodes the message in step 704. The subscriber station then uses the one or more time-frequency resources indicated in the interference sensing message to perform interference power estimation in step 706.

Indicating the unused or reserved resources does not have to be the sole functionality of the interference sensing message. For example, in some embodiments, the indication of used, unused, or reserved resources can be combined with other control information and transmitted within one control message. The information can be combined in different ways without departing from the spirit of the invention. In other embodiments, for example, the bits for resource indication can be concatenated with other control information. In yet other embodiments, certain values of a control message can be used to indicate unused or reserved resources while other values are used for other control information.

Although the embodiments of the invention are discussed with respect to interference power estimation in downlink OFDMA systems, one of ordinary skill in the art would recognize that the embodiments of the inventions have applicability to other estimation of signals from stations other than the primary serving station, and other type of multiple access systems, in both downlink and uplink channels.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a base station comprising:
   determining, based on system deployment information, one or more time-frequency resources to be used for interference power estimation, wherein the system deployment information comprises at least one of: a frequency reuse factor, an inter-cell interference management scheme, and a fractional frequency re-use pattern;
   generating a message indicating the one or more time-frequency resources to be used for interference power estimation by a subscriber station; and
   transmitting the message to the subscriber station.

2. The method of claim 1, wherein a time-frequency resource of the one or more time-frequency resources is one of a resource element and a sub-carrier.

3. The method of claim 1, wherein the one or more time-frequency resources comprises a used time-frequency resource and an unused time-frequency resource.

4. The method of claim 1, wherein the one or more time-frequency resources comprises a reserved time-frequency resource.

5. The method of claim 1, wherein generating a message indicating one or more time-frequency resources to be used for interference power estimation further comprises:
   addressing the message to an identification.

6. The method of claim 5, wherein the identification is one of a media access control (MAC) identification and a user equipment (UE) identification.

7. The method of claim 1, wherein the message is one of a signaling message and a control channel message.

8. The method of claim 1, wherein the one or more time-frequency resources indicated in the message are dynamically adjusted.

9. A wireless communication network comprising a plurality of base stations capable of wireless communication with a plurality of subscriber stations within a coverage area of the network, wherein at least one of the plurality of base stations is configured to:
   determine, based on system deployment information, one or more time-frequency resources to be used for interference power estimation, wherein the system deployment information comprises at least one of: a frequency reuse factor, an inter-cell interference management scheme, and a fractional frequency re-use pattern;
   generating a message indicating the one or more time-frequency resources to be used for interference power estimation by at least one of the plurality of subscriber stations; and
   transmit the message to the at least one subscriber station.

10. The network of claim 9, wherein a time-frequency resource of the one or more time-frequency resources is one of a resource element and a sub-carrier.

11. The network of claim 9, wherein the one or more time-frequency resources comprises a used time-frequency resource and an unused time-frequency resource.

12. The network of claim 9, wherein the one or more time-frequency resources comprises a reserved time-frequency resource.

13. The network of claim 9, wherein the at least one base station is configured to address the message to an identification.

14. The network of claim 13, wherein the identification is one of a media access control (MAC) identification and a user equipment (UE) identification.

15. The network of claim 9, wherein the message is one of a signaling message and a control channel message.

16. The network of claim 9, wherein the one or more time-frequency resources indicated in the message are dynamically adjusted.

17. A base station capable of wireless communication with a plurality of subscriber stations within a coverage area of a network, where the base station is configured to:
- determine, based on system deployment information, one or more time-frequency resources to be used for interference power estimation, wherein the system deployment information comprises at least one of: a frequency reuse factor, an inter-cell interference management scheme, and a fractional frequency re-use pattern;
- generate a message indicating the one or more time-frequency resources to be used for interference power estimation by a subscriber station; and
- transmit the message to the subscriber station.

18. The base station of claim 17, wherein a time-frequency resource of the one or more time-frequency resources is one of a resource element and a sub-carrier.

19. The base station of claim 17, wherein the one or more time-frequency resources comprises a used time-frequency resource and an unused time-frequency resource.

20. The base station of claim 17, wherein the one or more time-frequency resources comprises a reserved time-frequency resource.

21. The base station of claim 17, wherein the base station is configured to address the message to an identification.

22. The base station of claim 21, wherein the identification is one of a media access control (MAC) identification and a user equipment (UE) identification.

23. The base station of claim 17, wherein the message is one of a signaling message and a control channel message.

24. The base station of claim 17, wherein the one or more time-frequency resources indicated in the message are dynamically adjusted.

25. A subscriber station capable of wireless communication with a base station within a coverage area of a network, wherein the subscriber station is configured to:
- receive a message indicating one or more time-frequency resources to be used for interference power estimation, wherein the one or more time-frequency resources is selected based on a system deployment information comprising at least one of: a frequency reuse factor, an inter-cell interference management scheme, and a fractional frequency re-use pattern;
- decoding the message; and
- estimate an interference power using the one or more time-frequency resources indicated in the message.

26. The subscriber station of claim 25, wherein a time-frequency resource of the one or more time-frequency resources is one of a resource element and a sub-carrier.

27. The subscriber station of claim 26, wherein the one or more time-frequency resources comprises a used time-frequency resource and an unused time-frequency resource.

28. The subscriber station of claim 26, wherein the one or more time-frequency resources comprises a reserved time-frequency resource.

29. The subscriber station of claim 26, wherein the message is one of a signaling message and a control channel message.

30. The subscriber station of claim 26, wherein the one or more time-frequency resources indicated in the message are dynamically adjusted.

* * * * *